United States Patent [19]

Johnston

[11] 3,726,966
[45] Apr. 10, 1973

[54] BARIUM PROMOTED IRON OXIDE FOR USE AS A CATALYST IN STEAM-IRON PROCESS FOR PRODUCING HYDROGEN

[75] Inventor: Harlin D. Johnston, Bartlesville, Okla.

[73] Assignee: Phillips Petroleum Company, Bartlesville, Okla.

[22] Filed: Oct. 6, 1970

[21] Appl. No.: 78,566

[52] U.S. Cl. ................................ 423/658, 352/473
[51] Int. Cl. ................................................ C01b 1/08
[58] Field of Search .................. 23/214; 252/473; 423/658, 657

[56] References Cited

UNITED STATES PATENTS

| | | | |
|---|---|---|---|
| 2,449,004 | 9/1948 | Morrell et al. | 252/473 X |
| 2,449,635 | 9/1948 | Barr | 23/214 |
| 2,509,204 | 5/1950 | Bilisoly | 252/473 X |
| 2,635,947 | 4/1953 | Reed et al. | 23/214 |
| 3,017,250 | 1/1962 | Watkins | 23/214 |
| 3,100,234 | 8/1963 | Lee | 252/473 X |
| 3,179,488 | 4/1965 | Appell | 252/473 X |
| 3,448,058 | 6/1969 | Arnold | 252/473 X |

FOREIGN PATENTS OR APPLICATIONS

| | | | |
|---|---|---|---|
| 28,904 | 1913 | Great Britain | 23/214 |
| 125,410 | 4/1919 | Great Britain | 23/214 |
| 145,824 | 6/1920 | Great Britain | 252/473 |

*Primary Examiner*—Edward Stern
*Attorney*—Young and Quigg

[57] ABSTRACT

Barium is incorporated with iron oxide to prepare a catalyst or contact mass for use in steam-iron process for producing hydrogen. A process for producing hydrogen using such catalyst is set forth.

4 Claims, No Drawings ically, but this is not necessary since the invention has been found highly successful using coprecipitation of the iron and barium as described herein.

BARIUM PROMOTED IRON OXIDE FOR USE AS A CATALYST IN STEAM-IRON PROCESS FOR PRODUCING HYDROGEN

This invention relates to the production of a catalyst. It also relates to the production of hydrogen. In one of its aspects, the invention relates to the production of a promoted iron oxide catalyst. In another one of its aspects, the invention relates to the process for producing hydrogen using a promoted iron oxide catalyst as described herein.

In one of its concepts, the invention provides a catalyst or contact mass suitable for use effectively to produce hydrogen from steam which comprises promoting an iron oxide catalyst or contact mass with barium. In another of its concepts, the invention provides a catalyst as herein described in which an iron compound and a barium compound are coprecipitated to provide internally distributed barium within the iron oxide catalyst. In a further concept, the invention provides a process for the production of hydrogen from steam by contacting steam with an iron oxide catalyst promoted as herein described.

As known, hydrogen is used in a variety of processes for beneficiating hydrocarbonaceous materials, such as petroleum oil, petroleum residua, coal, tar sands, oil shale and the like. Usually, the objective is to convert such materials to liquid hydrocarbons of certain properties which are required for various uses of the products.

Considerable emphasis has been placed upon hydrogen production in recent years because of dwindling supplies of crude oil and the likely necessity for converting coal, petroleum residuum, tar sands, or oil shale to liquid hydrocarbons. Such conversions require copious volumes of low-cost, relatively pure hydrogen which is needed to be generated on location.

A promising route to such hydrogen is the steam-iron process. In this process, a reduced form of iron oxide is oxidized with steam to produce hydrogen and then reduced again by contact with low-cost reducing gases to complete the two-stage cycle. In practice, the process is a continuous one in which the solid iron oxide is alternatingly in or moved between a reduction zone and air oxidation zone.

A great deal of development work has been carried out on the steam-iron process to make it more efficient and more economical. The present invention provides an improvement in the steam-iron process by providing a promoter for the iron oxide which increases the conversion rate of the iron oxide in both the oxidative and reductive phases of the cycle, and which minimizes the amount of iron oxide required to operate such a system.

I have now discovered that barium promoted iron oxide steam-iron process catalyst is highly effective for the conversion of steam to hydrogen. I have discovered that such a catalyst or contact mass, particularly as produced by coprecipitation method is highly effective even upon continued use to produce hydrogen from steam. More specifically, I have discovered, further, that internally distributed barium within an iron oxide catalyst or contact mass for use in the steam-iron process is a highly effective catalyst having a long life even after several oxidative and reductive cycles.

An object of this invention is to produce a catalyst. It is a further object of this invention to produce a catalyst suitable for improved operation of the steam-iron oxide process for producing hydrogen. It is a further object still of this invention to provide an improved process for the production of hydrogen employing the steam-iron catalyst process. Still another object of the invention is to provide an improved catalyst for the steam-iron oxide process for producing hydrogen by using a particular method from among those available for preparing catalysts or contact masses.

Other aspects, concepts, objects and several advantages of the invention are apparent from a study of this disclosure and the appended claims.

According to the present invention, an improved iron oxide catalyst which is suitable for use in the steam-iron process for production of hydrogen is prepared by incorporating with iron oxide the metal barium. In one modification the catalyst or contact mass is prepared by a coprecipitation of water soluble compounds of the barium and the iron following which the co-precipitated compounds are conventionally washed and dried in calcine to produce a material as described further herein.

Still according to the present invention, there is provided a process for the production of hydrogen from steam by contacting the steam under conditions of hydrogen production with an iron oxide catalyst promoted with barium. In a modification of the process, now preferred, the process employs a catalyst or contact mass prepared by a coprecipitation method as further described herein.

The iron oxide catalyst used in the improved steam-iron process of the present invention comprises a major amount of iron oxide ($Fe_2O_3$) and a minor amount of barium. The barium is intimately and uniformly distributed throughout the iron oxide and is present in amounts ranging from about 0.2 to about 1.5, preferably from about 0.5 to about 1 weight percent based upon the weight of the total iron oxide-containing composition, calculated as the metal. Further, the barium-promoted iron oxide composition is of catalytic grade or equivalent; that is, the composition generally and usually is preferably a porous one having a surface area of at least about 1 square meter per gram and should have a pore volume of at least 0.5 ml/g in pores larger than about 200A.

PREPARATION OF BA-PROMOTED IRON OXIDE

The barium-promoted iron oxide composition can be prepared by any convenient catalyst or contact mass preparation method which provides an intimate and homogeneous mixture of these two materials. One suitable method is by coprecipitation in which are used soluble compounds of iron and barium which are converted to the oxides on calcination and which are coprecipitated such as by the addition of ammonium hydroxide to an aqueous solution containing said compounds. The precipitate is then conventionally washed, aged, dried, and calcined to obtain an active iron oxide composition having the desired surface area and pore volume characteristics.

Another method is by preparing an intimate mixture of the mixed oxides of barium and iron. Barium oxide and iron oxide can be intimately blended in a ball mill, for example, or powders of these oxides can be either dry mixed or wet mixed in an aqueous slurry to thoroughly homogenize the mixture. The homogenized mixtures can then be converted into desired forms such as pellets, agglomerates, extrudates, or other particle shapes using conventional catalyst forming methods.

It has been found that the incorporation of barium using the impregnation method is not suitable for producing the improved iron oxide compositions of the present invention. The reason for this is not known with certainty, but it is presently believed that for the barium to be effective, it must be uniformly and internally present virtually in each iron oxide-containing particle. Impregnation methods are believed to deposit the barium substantially only on external surfaces of iron oxide particles.

Barium-promoted iron oxide can be prepared having the desired characteristics of surface area and pore volume by using conventional catalyst or contact mass preparation methods known in the art. Alternatively, the barium-promoted iron oxide materials can be treated to increase the number or pores by conventional treatment methods such as steam treatments or by treatment with other agents which can increase the size of the pores, e. g., leaching.

STEAM-IRON PROCESS CONDITIONS

The barium-promoted iron oxides of the present invention are utilized in the steam-iron process under conventional conditions; that is, the barium-modified iron oxide is used in the same manner and under the same conditions as the non-modified iron oxide for the reductive and oxidative portions of the process to produce hydrogen. The improved iron oxide results in a greater conversion rate in each phase of the cycle and thus can significantly reduce the cycle time. Additionally, the barium-promoted iron oxide will remain active for a longer period of time and, thus, iron oxide replacement costs can be reduced.

In general, both the reductive and the oxidative phases of the cycle are carried out at temperatures in the range of from about 1200° to about 1700°F, preferably from about 1300° to about 1450°F. Any convenient pressure can be used such as pressures in the range of from about 0 to about 2000 psig. Any suitable mode of contact between the iron oxide and the reducing or oxidizing gases can be used, including fixed bed operation, fluidized bed operation, and the like. A particularly preferred mode is the free-falling bed wherein particles of the iron oxide are allowed to fall through a reaction chamber while in contact with a countercurrent flow of reaction gases.

The reactive gases in the reductive zone can be any suitable CO and/or $H_2$-containing gas streams. Particularly suitable are the CO and $H_2$-containing synthesis gas or producer gas streams obtained by suitably reacting heavy carbonaceous fuels with air and steam. The oxidizing gas used in the hydrogen generation zone is preferably steam with few or no other components.

The flow rates of the iron oxide and/or the reactive gases within the individual reaction zones will be such as to convert a suitable amount of each of these reagents. For example, the iron oxide is not generally reduced beyond about a 10 percent weight loss, preferably not beyond a 7 percent weight loss because an excessive reduction results in the formation of metallic iron in the iron oxide particles. The presence of metallic iron can cause sintering and an irreversible loss of activity of the iron oxide. Typically, the flow of reducing gas is such that about 65 or more percent conversion of that gas occurs. Similarly, the flow of steam is such that at least about 50 percent of the steam is converted. In a free-falling bed operation, a typical gaseous hourly space velocity (GHSV) for both reactive gases is 300–350 GHSV.

The gaseous effluent from the oxidative zone of the process comprises hydrogen and steam with perhaps small quantities of hydrogen sulfide. The steam can be condensed and the hydrogen sulfide scrubbed from the stream so as to yield a hydrogen stream of about 99+ percent purity.

EXAMPLE 1

A number of samples of metal-promoted and unpromoted iron oxides were tested under comparable conditions for the efficiency with which they could be alternatingly reduced with CO and oxidized with steam, the latter operation yielding free hydrogen gas. The procedure was as follows: a porous woven quartz sample holder, about 2.5 mm ID by 40 mm long was filled with the 32/65 mesh iron oxide-containing sample; the holder was suspended from a recording balance by a quartz fiber and was positioned in an electrically heated 1 inch diameter reaction tube; the sample was dried in a nitrogen atmosphere at 1292°F and weighed; the iron oxide-containing sample was then reduced at 1292°F in a preheated CO stream flowing at 25 l/hr until a 10 percent weight loss was obtained; the reduction was then halted and the reduced oxide sample was then subjected to oxidation at 1292°F by contact with preheated flowing steam until the weight loss had been regained; the steam atmosphere was prepared by passing nitrogen at 8 l/hr through a water saturator at 201° –205°F and then through the reactor; the weight losses and gains during the iron oxide reduction and oxidation stages had previously been shown to closely correspond to CO consumption and $H_2$ production.

The different iron oxide-containing samples were prepared in various ways. The coprecipitated samples were prepared by precipitating both the iron and the metal promoter from a solution of their soluble salts, such as the halides or nitrates, by the addition of precipitating agents such as ammonia, followed by drying and calcining. The impregnated samples were prepared by contacting particles of the solid iron oxide with a solution of a soluble salt of a promoting metal, followed by drying, and calcining. The mixed oxide samples were prepared by intimately mixing, in an aqueous slurry, a mixture of powdered iron oxide and promoter metal oxide, followed by drying, calcining, and screening to obtain particles containing an intimate mixture of both oxides.

The results of the tests showing the suitability of the different iron oxide samples for use in the steam-iron process are shown in the table. For several of the runs, including the invention runs, the CO consumption rates and the $H_2$ production rates are shown after both the third and the tenth cycle of operation so that the effect of the promoter on the effective life of the iron oxide sample can be shown.

Comparing control Run 1 with invention Run 2 in the abovementioned table shows that intimately associating a minor quantity of barium with the iron oxide results in a dramatic improvement in both the CO consumption (iron oxide reduction) rate and the $H_2$ production (iron oxide oxidation) rate portions of the cycle. The fact that the surface areas and the pore volumes in pores of 200A are essentially the same further emphasizes that the improvement is due to the presence of the barium promoter.

Comparing invention Run 2 and Run 3 shows that the manner of barium incorporation into the oxide is critical. When the iron oxide of Run 1 was impregnated with barium nitrate to produce the promoted iron oxide of Run 3, an improvement in the conversion rates was obtained. However, the conversion rates with the impregnated iron oxide declined much faster on continued cycling than with the coprecipitated iron oxide of Run 2.

Runs 4 and 5 show that, in addition to the presence of promoted amounts of barium, the iron oxide composition should have a substantial pore volume, at least about 0.5 ml/g, in pores of 200A or larger. Run 6 shows that conversion rates are decreased and substantial carbon deposition occurs if excessive amounts of barium are incorporated into the iron oxide. Carbon formation is undesirable because it leads to inactivation of the iron oxide and decreases the purity of the hydrogen product.

Runs 7 through 11 show that not all metal oxides have the capacity to promote iron oxide for these reactions. Even magnesium, another alkaline earth group metal, is not effective as an acceptable promoter. Several other metal promoters reduce rather than increase the conversion rates of the iron oxide in this reaction.

In other similar tests, the incorporation of alkali metals, such as sodium, lithium, and potassium, into the iron oxide was found to give very little improvement in conversion rates and to deposit excessive amounts of carbon on the iron oxide base.

pended claims to the invention, the essence of which is that barium promoted iron oxide catalyst or contact mass or steam-iron reduction of hydrogen has been provided, particularly that the barium is incorporated with the iron oxide is herein described by a coprecipitation or equivalent method and that a process for the production of hydrogen by the steam-iron process employing such a catalyst or contact mass has been provided.

I claim:

1. A process for production by hydrogen by the known steam-iron process which comprises employing a catalyst which comprises iron oxide promoted with barium, said catalyst having a surface area of at least about one square meter per gram and a pore volume of at least 0.5 ml/g in pores larger than about 200 A, said catalyst having an effective life after several oxidative and reductive cycles.

2. A process for the production of hydrogen by the known steam-iron process which comprises employing a catalyst which comprises iron oxide promoted with barium having a surface area of at least about one square meter per gram and a pore volume of at least 0.5 ml/g in pores larger than about 200 A, said catalyst having an effective life after several oxidative and reductive cycles and the barium being internally distributed throughout the iron oxide mass of the catalyst as can be obtained by a coprecipitation method followed by drying and calcining.

3. A process for producing hydrogen by the known steam-iron process under which comprises contacting with steam a barium promoted iron oxide catalyst having intimately uniformly distributed throughout the iron oxide an approximate amount of from about 0.2 to about 1.5 weight percent, based on the weight of the total iron oxide-containing composition of barium, calculated as the metal, said barium being incorporated with the iron oxide in a composition having a surface area of at least about 1 square meter per gram and a pore volume of at least 0.5 ml/g in pores larger than about 200 A.

4. A process according to claim 3 wherein the catalyst is obtained by coprecipitation, drying and calcining.

STEAM-IRON PROCESS FOR HYDROGEN PRODUCTION

| Run | Promoter [e] | Surface area. m.²/g. | Pore vol., ml./g.[b] | CO consumption rate [c] | | | $H_2$ production rate [d] | | |
|---|---|---|---|---|---|---|---|---|---|
| | | | | 3d cycle | 10th cycle | Decrease, percent | 3d cycle | 10th cycle | Decrease, percent |
| 1 | None | 8.1 | 0.92 | 179 | 131 | 26.8 | 222 | 174 | 21.6 |
| 2 | 0.8% Ba (coprecip.) | 9.4 | 1.0 | 300 | 280 | 6.7 | 389 | 378 | 2.8 |
| 3 | 0.8% Ba (impreg.) | | | 258 | 179 | 30.6 | 362 | 286 | 21.0 |
| 4 | 1.3% Ba (coprecip.) | | 0.36 | 158 | 175 | | 297 | 248 | 16.5 |
| 5 | 0.8% Ba (coprecip.) | 13.8 | 0.26 | 126 | 116 | 8.0 | 185 | 124 | 33.0 |
| 6 | 3% Ba (mixed oxide) | | | [a] 87 | | | 181 | | |
| 7 | 1% Mg (mixed oxide) | | | 140 | [a] 98 | 30.0 | 228 | 149 | 34.7 |
| 8 | 1% Cd (coprecip.) | | | 99 | | | 284 | | |
| 9 | 5% SnO (mixed oxide) | | | 41 | | | 145 | | |
| 10 | 1% NiO (coprecip.) | | | 39 | | | 74 | | |
| 11 | 1% CuO (coprecip.) | | | 17 | | | 71 | | |

[a] Excessive carbon deposition.
[b] Pore volume in pores of 200 A. or greater (measured by mercury intrusion method).
[c] In terms of cc. of CO reacted per minute per gram of iron oxide-containing sample.
[d] In terms of cc. of $H^2$ produced per minute per gram of iron oxide-containing sample.
[e] Promoters calculated in weight percent based on weight of total $Fe_2O_3$-containing composition.

Reasonable variation and modification are possible within the scope of the foregoing disclosure and the appended claims.

* * * * *